Inventors:
Gerhard Hochgesand, Hellmut Heidl, Herbert Unland, Alexander Doerges and Karl Bratzler
By: Burgess, Dinklage and Sprung
Attorneys Inventor:
Gerhard Hochgesand, Hellmut Heidl, Herbert Unland, Alexander Doerges and Karl Bratzler
By: Burgess, Dinklage & Sprung
Attorneys

United States Patent Office 3,505,784
Patented Apr. 14, 1970

3,505,784
SCRUBBING PROCESS FOR REMOVING CARBON DIOXIDE FROM LOW-SULFUR FUEL GASES OR SYNTHESIS GASES
Gerhard Hochgesand, Neu Isenburg, Hellmut Heidl, Bad Homburg var der Hohe, Herbert Unland, Lorsbach, Taunus, Alexander Doerges, Oberursel, Taunus, and Karl Bratzler, Bad Homburg var der Hohe, Germany, assignors to Metallgesellschaft Aktiengesellschaft, Frankfurt am Main, Germany, a corporation of Germany
Filed Oct. 20, 1967, Ser. No. 676,937
Claims priority, application Germany, Oct. 25, 1966, M 71,431
Int. Cl. B01d 19/00
U.S. Cl. 55—44                14 Claims

ABSTRACT OF THE DISCLOSURE

Feed gases having a zero to low sulfur content is scrubbed with N-methyl pyrrolidone as an absorbent at about ambient temperature to absorb carbon dioxide from said gas to a residual content below 40 parts per million. The rich absorbent thus produced is regenerated to remove absorbed carbon dioxide therefrom by flashing said rich absorbent and stripping it with a gas having a low carbon dioxide content. Absorbent which has thus been regenerated is re-used for scrubbing additional quantities of said feed gas.

---

Figure 1:
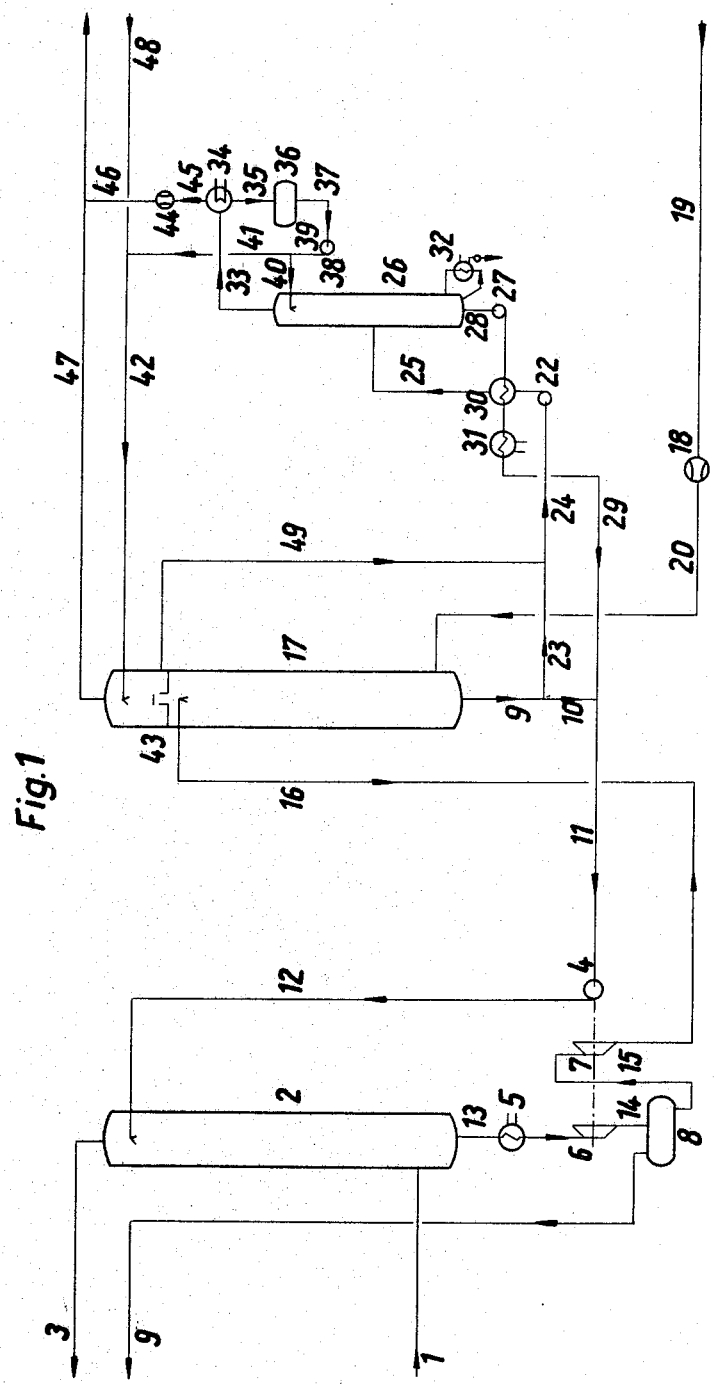

This invention relates to a scrubbing process for removing carbon dioxide from fuel gases or synthesis gases which are free of sulfur or have only a very low sulfur content.

In recent times, it is often desired to remove carbon dioxide which is present in a relatively high-concentration from industrial gases which are free of sulfur or have a very low sulfur content. For instance, natural gases which contain sulfur are desulfurized in most cases in the field by a joint treatment of the gases coming from several wells so that the recovery of sulfur is centralized. This recovery of sulfur may be fairly profitable. The natural gas supplied from the natural gas field is then virtually free of sulfur but may contain considerable amounts of carbon dioxide.

When it is desired to convert such gas into a synthesis gas, e.g., a mixture of carbon monoxide and hydrogen, or further into pure hydrogen, the cracked feed gas initially obtained has an even higher content of carbon dioxide.

The same applies to the recovery of synthesis gases or hydrogen from sulfur-free refinery gases by a cracking of the hydrocarbons which are contained in the gases produced in the refinery.

Gases having a high carbon dioxide content and virtually free of sulfur are also obtained in the catalytic cracking of liquid hydrocarbons with steam and, if desired, oxygen, if the feeds are inherently free of sulfur or are desulfurized immediately before the cracking treatment in order to avoid a contamination of the cracking catalyst.

It is known to remove carbon dioxide from gases by scrubbing with alkaline solutions of alkali salts of weak inorganic or organic acids or with liquid organic bases. The absorbed carbon dioxide may be stripped from the laden, neutralized solutions by heating the latter and bubbling steam or air through them so that the solution is regenerated and when cooled can be re-used as an absorbent.

In the processes, which are described as chemical gas-scrubbing processes or neutralizing scrubbing processes, the loading capacity depends substantially on stoichiometric laws and is almost independent of the total pressure of the gas. Said processes are mainly employed to remove medium or low concentrations of carbon dioxide to a high degree of purity, i.e., as so-called fine scrubbing processes, or to purify gases which have not been compressed or which have been only slightly compressed. These chemical scrubbing processes have also been used for a removal of all acid components of the gas, i.e., for a joint removal of carbon dioxide and hydrogen sulfide.

For a removal of acid components from gases which have been compressed, e.g., to 15 kg./sq. cm. absolute pressure or more, and which have a relatively high content of acid components, the so-called physical gas-scrubbing processes have been used to advantage. In these processes, the gas components to be removed are dissolved rather than chemically combined. The solubility of the gas components is defined by Henry's law. The loading capacity of the absorbent depends on the coefficient of absorption of each gas component and on pressure and temperature, the loading capacity increasing with a rise in pressure and a drop in temperature.

Physical absorbents are preferably regenerated by being flashed to ambient or even lower pressure and, if desired, by heating.

The simplest and probably oldest physical gas-scrubbing process is the scrubbing of compressed gases with water to remove carbon dioxide.

The carbon dioxide which is dissolved under pressure in water is stripped off by flashing and, if desired, by bubbling air through the water. The regenerated water is then recycled to the absorption process.

It is known to remove carbon dioxide from technical gases having a high content of carbon dioxide by scrubbing with organic solvents at temperatures below $-10°$ C., preferably at $-40°$ C. to $-80°$ C.

In a known process, which is preferably employed for purifying gases at high rates of about $10^6$ and more standard cubic meters per day, synthesis gases produced by a gasifying treatment of solid or liquid fuel with oxygen and steam are scrubbed at temperatures to about $-50°$ C. and pressures above about 10 kg./sq. cm. absolute pressure to remove all gas components except for the difficultly liquefiable gases CO, $H_2$, $CH_4$. The gas components thus removed comprise particularly hydrogen sulfide and organic sulfur compounds, carbon dioxide and unsaturated hydrocarbons. Suitable absorbents include methanol, ethanol, acetone, toluene, xylene, heptane, and the like.

Whereas it is advantageous to remove undesired gas components, e.g. from a synthesis gas by scrubbing in a joint absorption process, this practice also involves a disadvantage. When $H_2S$ and $CO_2$ are jointly removed, the further processing of the $H_2S$ from the exhaust gas obtained by regeneration is rendered difficult because it is often highly diluted by $CO_2$. For this reason, the low-temperature processes are carried out in most cases in a plurality of stages so that the regeneration of the absorbent from one stage produces a gas which contains as much $H_2S$ as possible and the regeneration of the absorbent from another stage produces a gas which is free of sulfur.

Physical absorbents have also been found which have a much higher dissolving power for hydrogen sulfide than for carbon dioxide.

The German patent specification No. 1,154,591 describes a scrubbing process for a selective removal of hydrogen sulfide in preference to carbon dioxide with the aid of N-methyl pyrrolidone as a preferred, selective absorbent.

N-methyl pyrrolidone has a high differential dissolving power, e.g., for diacetylenes and acetylenes in preference to diolefins and olefins, and is used for this reason on a large scale for a selective recovery of acetylene from gases obtained by pyrolytic cracking of hydrocarbons.

N-methyl pyrrolidone has an extremely high dissolving power of hydrogen sulfide in preference to carbon dioxide.

The dissolving power values of N-methyl pyrrolidone for hydrogen sulfide and carbon dioxide expressed by Bunsen's coefficient as standard cubic meters of dissolved gas per cubic meter of solvent at 20° C. and a partial pressure of 1 kg./sq. cm. absolute pressure are $H_2S$:46

$CO_2$:3.8

The corresponding values for water are $H_2S$:2.6

$CO_2$:0.9

The dissolving power of N-methyl pyrrolidone for hydrogen sulfide is eighteen times that of water. The dissolving power of N-methyl pyrrolidone for carbon dioxide at a partial pressure of carbon dioxide of 1 kg./sq. cm. absolute pressure is still about four times that of water.

It is an object of this invention to provide a novel process for the removal of carbon dioxide from gases containing such.

It is another object to provide such a carbon dioxide stripping process in combination with a regeneration process for ridding the absorbent of absorbed carbon dioxide.

Other and additional objects of this invention will become apparent from a consideration of this entire specification including the drawing and claims hereof.

In accord with fulfilling these objects, one aspect of this invention resides in a process for removing carbon dioxide from gases containing such, which gases also contain little or no sulfur values by imparting a superatmospheric pressure to the carbon dioxide-containing feed gas; scrubbing said feed gas with N-methyl pyrrolidone at about ambient temperatures; and regenerating said N-methyl pyrrolidone to remove the absorbed carbon dioxide values therefrom by pressure reduction or flashing. It may be preferred to strip the N-methyl pyrrolidone with a gas having a low carbon dioxide content after said flashing.

It has been found that Bunsen's coefficient of N-methyl pyrrolidone for $CO_2$ increases with an increase in the partial pressure of $CO_2$ and amounts to 4.7 standard cubic meters per cubic meter and per kg./sq. cm. absolute pressure at a partial pressure of $CO_2$ of 15 kg./sq. cm. absolute pressure (at 20° C.), whereas Bunsen's coefficient of water at the same partial pressure of $CO_2$ (also at 20° C.) is only 0.65 standard cubic meter per cubic meter per kg./sq. cm. absolute pressure compared to the figure of 0.9 at normal pressure. Hence, the solubility of $CO_2$ in N-methyl pyrrolidone in this case is about seven times that in water.

Due to its relatively high chemical stability, N-methyl pyrrolidone is particularly suitable for scrubbing carbon dioxide from gases. Due to this chemical stability, $CO_2$-laden N-methyl pyrrolidone can be regenerated by flashing and a subsequent bubbling of air or other gases having a low $CO_2$ content through the absorbent. The use of N-methyl pyrrolidone as an absorbent enables an economically attractive fine purification of gases by scrubbing to remove $CO_2$ to residual concentrations of 40 p.p.m. and less. Such process can be operated without consumption of steam in the scrubbing fluid cycle and without need for a refrigerator.

As the freezing point of N-methyl pyrrolidone lies between —25° C. and —35° C., depending on its water content, this process can be operated satisfactorily even when the ambient temperature drops below 0° C. for a relatively long time. A formation of ice in the feed gas conduit can be prevented by an injection of N-methyl pyrrolidone.

Such $CO_2$-removing plant may be filled, started and shut down at freezing temperatures without need for draining the scrubbing fluid from the shut-down plant.

The invention provides a scrubbing process for removing carbon dioxide to a residual concentration below 40 p.p.m. from compressed fuel or synthesis gases which have a low sulfur content or are free of sulfur by scrubbing with an organic solvent, which is conducted in a cycle through absorbing and regenerating steps.

The process according to the invention is characterized in that the gas to be purified is scrubbed approximately at ambient temperature with N-methyl pyrrolidone as an absorbent, the absorbent laden with carbon dioxide is regenerated in a manner known per se by flashing to ambient pressure and bubbling air or other gases which are poor in $CO_2$ through the absorbent.

The scrubbing fluid can be flashed in such a manner that a large portion of the desorbed $CO_2$ is recovered with a purity of 99.9 and more percent by volume so that the recovered $CO_2$ may be used for a synthesis of urea or in the food-processing industry.

To keep other gaseous components, particularly water vapor, from the N-methyl pyrrolidone or to prevent an increase of the concentration of such other gas components in the N-methyl pyrrolidone above a predetermined upper limit, it is suitable to separate a partial stream from the system, which includes the absorption of carbon dioxide and regeneration, and to subject said partial stream to distillation before it is returned to the main cycle. This distillation is preferably conducted under vacuum and controlled to distill off those impurities, including water, which have a lower boiling point than the absorbent.

The distillation may also be controlled to distill off the absorbent itself. This mode of operation will be adopted, at least temporarily, when higher-boiling impurities are enriched in the absorbent, e.g., as a result of the resinification of unsaturated hydrocarbons.

The water content of the absorbent should be as high as possible to facilitate the separation of a certain amount of $H_2O$ from the scrubbing fluid cycle. With a high water content, the partial stream of scrubbing fluid to be tapped off may be smaller and the pressure in the vacuum distillation step may be higher than with a low content of water. On the other hand, the water content of the scrubbing fluid should be as low as possible in order to obtain a high dissolving power for $CO_2$.

It has been found that the optimum water content of N-methyl pyrrolidone when used as a scrubbing fluid for removing $CO_2$ lies between 0.5% and 3% by weight and is preferably approximately 1% by weight.

Due to the very low volatility of N-methyl pyrrolidone, it is usually not required to recover scrubbing fluid from the pure gas. A recovery of scrubbing fluid may only be desired from the gases which have been desorbed at low pressure in the regeneration step and from the stripping gas which contains $CO_2$. Due to the very high solubility of N-methyl pyrrolidone in water, the gases which escape at a low pressure from the scrubbing plant are suitably scrubbed with a relatively small amount of water to remove the evaporated scrubbing fluid from such gases. The water used for scrubbing and laden with N-methyl pyrrolidone may then be passed together with the above-mentioned tapped partial stream of scrubbing fluid into a column for the separation of N-methyl pyrrolidone and $H_2O$.

The absorbent for removing $CO_2$ is generally loaded and regenerated approximately at ambient temperature. Temperature changes within the scrubbing fluid cycle are mainly due only to the heats of absorption and desorption.

This constitutes the technical advantage which is afforded by the process according to the invention.

The same provides a removal of $CO_2$ from gases to a high purity by scrubbing in a single stage and the absorption and desorption can be effected in the same low temperature range.

The process can be carried out with the use of very simple equipment which does not differ greatly from the known equipment for scrubbing gases with water under pressure. The equipment consists substantially of a scrubbing tower, a flashing unit, a stripping tower, a stripping gas blower and a circular pump suitably coupled to a flashing turbine supplied with the scrubbing fluid which has been laden under pressure. If the feed gas is at relatively high temperatures, the plant comprises in the absorbent cycle only a cooler for the dissipation of the heat which is generated by the pump and of the surplus heat which is due to the thermal and other energy balance for the inflowing and outflowing gases.

Figure 2:
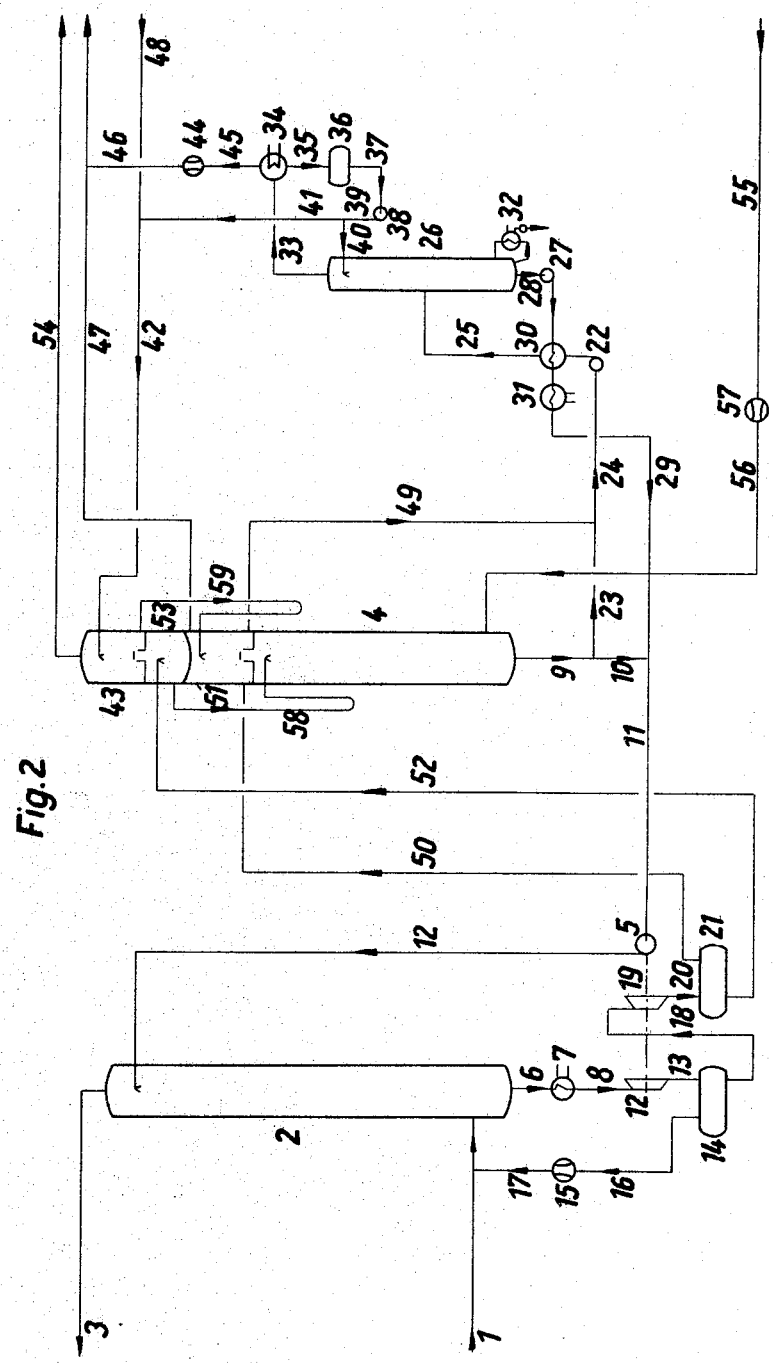

Understanding of this invention will be facilitated by reference to the accompanying drawing in which:

FIG. 1 is a schematic flow diagram of one form of the process of this invention; and FIG. 2 is similar to FIG. 1 showing an alternate embodiment.

In the plant shown in FIG. 1, a feed gas which has a relatively high $CO_2$ content and is to be purified flows through a conduit 1 to an absorber 2, wherein carbon dioxide is selectively removed to a residual content below about 40 p.p.m. in a single scrubbing step. Pure gas leaves the absorber through a conduit 3.

A pump 4 supplies scrubbing fluid through conduits 9, 29, 11, and 12 to the absorber 2, where the scrubbing fluid is loaded with $CO_2$ while flowing countercurrent to the gas to be purified. Scrubbing fluid is withdrawn through a conduit 13 from the bottom of the absorber and supplied to a cooler 5, where the surplus heat of the scrubbing cycle is removed. The scrubbing fluid is partly flashed and part of the pressure energy of the scrubbing fluid is recovered in turbines 6 and 7 which drive the pump 4. A mixture of gas and washing fluid is drained through a conduit 14 from the first turbine 6 and is separated in a container 8. The gas which has been flashed off in this first flashing stage preferably contains co-absorbed useful gas components, such as CO, $H_2$, $CH_4$, and leaves the plant as fuel gas through a conduit 9. The scrubbing fluid flows from the container 8 through a conduit 15 into the second flashing turbine 7. The mixture of flashed-off gases and scrubbing fluid flows from the turbine through a conduit 16 into a stripping tower 17, where the residual $CO_2$ is stripped off with air supplied by a blower 18 through conduits 19 and 20 into the stripping tower. The scrubbing fluid from which the $CO_2$ has been stripped is returned by the pump 4 to the absorber.

The feed gas and stripping gas introduce water vapor, in an amount which depends on the temperature and pressure of said gases, into the plant. This water vapor is absorbed by the scrubbing fluid. To maintain a substantially constant water content of the scrubbing fluid, a partial stream of scrubbing fluid is tapped from the main cycle of scrubbing fluid and is supplied by a pump 22 through conduits 23, 24, and 25 into a separating column 26 operated under a vacuum. In this column, the surplus water is distilled from the partial stream of scrubbing fluid. The scrubbing fluid supplied to the separating column 26, less the removed water, is fed by a pump 27 through conduits 28 and 29 into the main cycle of the scrubbing fluid. The scrubbing fluid withdrawn from the column 26 flows through heat exchangers 31 and 30 to transfer heat respectively to cooling water and to the scrubbing fluid which is supplied to the column 26. An evaporator 32 serves for heating the separating column 26. The water vapor, withdrawn from the separating column 16 in a conduit 33, is liquefied in a condenser 34. The condensate from the condenser 34 is supplied through a conduit 35 to a container 36 and is collected there. A pump 38 feeds the condensate from a suction conduit 37 into a conduit 39 and returns part of the condensate as a reflux through a conduit 40 into the separating column 26. The major part of the condensate is supplied as scrubbing water through conduits 41 and 42 to a water scrubber 43 having only a few plates. The non-condensable gases and vapors are evacuated from the condenser 34 and introduced by a blower 44 through conduits 45 and 46 into an exhaust gas conduit 47.

In the water scrubber 43, the scrubbing water absorbs the N-methyl pyrrolidone vapors which have been evaporated from the scrubbing fluid and are contained in the exhaust gas. At the same time, the exhaust gas is saturated with water vapor. The scrubbing water is continually replenished by an addition of fresh condensate through a conduit 48. The absorbed N-methyl pyrrolidone is separated from the scrubbing water in the separating column 26. To this end, the rich scrubbing water is added through a conduit 49 to the partial stream which has been tapped from the main scrubbing cycle serving to remove $CO_2$.

The operation of a plant as shown in FIG. 1 will be explained further in Example 1.

FIG. 2 illustrates another embodiment of the process acording to the invention. In this embodiment, the regeneration yields pure $CO_2$ which is useful, e.g., for the synthesis of urea.

Gas is supplied through a conduit 1 to an absorber 2 and gas having a residual content of 10 p.p.m. $CO_2$ leaves the plant through a conduit 3.

Regenerated scrubbing fluid from the stripping tower 4 is supplied into the absorber 2 by the pump 5 through a transfer conduit consisting of sections 9, 10, 11, and 12. $CO_2$-laden scrubbing fluid flows through a conduit 6 into a cooler 7 and from the latter through a conduit 8 to a first turbine 12, where the scrubbing fluid is partly flashed and the energy thereof is recovered. The scrubbing fluid and the flashed-off gases flow through a conduit 23 into a degassing container 14. The flashed-off gases are recompressed and returned into the feed gas by a compressor 15 through conduits 16 and 17. The scrubbing fluid flows through a conduit 18 into a second turbine 19, where it is further flashed. A pump 5 is driven by turbines 12 and 19.

The gases which are desorbed as a result of the second flashing of the scrubbing fluid are conducted together with the scrubbing fluid, throuh a conduit 20 into a container 21, where the gas and liquid are separated. The flashed-off gas then flows through a conduit 50 to a water scrubber 51, which is provided at the head of the stripping column. The scrubbing fluid flows through a conduit 52 into a third flashing stage 53, which is mounted on the regenerating tower and also contains a water scrubbing zone at its head.

The third flashing of the scrubbing fluid produces a flashed-off gas containing more than 99.9% $CO_2$. The gas may well be used in the synthesis of urea or in the food processing industry. For this purpose, the gas flashed off in the third flashing stage is scrubbed with water in a separate scrubber 43 to remove absorbent vapor and is discharged through a conduit 54. The water flows from the scrubbing zone 43, which succeeds the flashing stage 53, through a conduit 58 into a scrubbing zone 51, which succeeds the stripper 4. The residual $CO_2$ which is contained in the scrubbing fluid after the several flashing stages is desorbed in the stripper 4, into which $CO_2$-free nitrogen is blown. This $CO_2$-free nitrogen may be available as an exhaust gas from an ancillary plant at the same site. The nitrogen flows through conduits 55 and 56 and its pressure is increased by the blower 57. In the subsequent water scrubbing zone 51, residual scrubbing fluid is removed from the mixture of $CO_2$ and $N_2$ withdrawn from the stripper 4 and the gas from the container 21. The combined gases are conducted into the exhaust gas conduit 47.

The scrubbing water for absorbing residual scrubbing fluid comes from conduit 42 and flows in succession through the two water scrubbers 43 and 51, which operate approximately at the same pressure and are connected by the water transfer conduit 59. This scrubbing water is admixed through conduit 49 to the branched-off partial stream of the scrubbing fluid, which is fed through conduits 23, 24 and 25 into the separating column 26.

The operation of the plant shown in FIG. 2 will be explained more fully in Example 2.

EXAMPLE 1

Feed gas at a rate of 100,000 standard cubic meters per hour is to be purified in the plant. The feed gas is under a pressure of 40 kg./sq. cm. absolute pressure and at a temperature of 25° C. It has the following composition in percent by volume:

| | Percent by volume |
|---|---|
| $CO_2$ | 35.0 |
| CO | 0.3 |
| $H_2$ | 64.0 |
| $CH_4$ | 0.3 |
| $N_2$ | 0.1 |
| Ar | 0.3 |
| | 100.0 |

The total analysis indicates that this high-hydrogen gas has been produced from a cracked gas which is similar to water gas by a conversion of its carbon monoxide content into hydrogen and carbon dioxide with the aid of steam.

To remove carbon dioxide from said gas to a residual concentration of 35 p.p.m., the gas is scrubbed with an absorbent consisting of 99% by weight of N-methyl pyrrolidone and 1% by weight of water and supplied at a rate of 810 cubic meters per hour.

The purified gas is withdrawn through conduit 3 from the absorption tower at a rate of 63,900 standard cubic meters per hour and is under a pressure of 39.6 kg./sq. cm. absolute pressure and has a temperature of 17° C. This gas has the following composition in percent by volume:

| | Percent by volume |
|---|---|
| $CO_2$ | 0.0035 |
| CO | 0.46 |
| $H_2$ | 98.5 |
| $CH_4$ | 0.41 |
| $N_2$ | 0.14 |
| Ar | 0.46 |
| | 99.9735 |

The laden absorbent is flashed to 20 kg./sq. cm. absolute pressure in the first turbine 6. As a result, a fuel gas having the following composition in percent by volume is obtained in conduit 9 at a rate of 1400 standard cubic meters per hour:

| | Percent by volume |
|---|---|
| $CO_2$ | 51.6 |
| CO | 0.22 |
| $H_2$ | 47.4 |
| $CH_4$ | 0.47 |
| $N_2$ | 0.07 |
| Ar | 0.22 |
| | 99.98 |

When flashed in the second flashing turbine 7, the absorbent is under a pressure of 1.2 kg./sq. cm. absolute pressure. Air at ambient temperature is bubbled at a rate of 10,000 standard cubic meters per hour through the absorbent in the regenerating tower. The gas which is exhausted through conduit 47 at a rate of 44,700 standard cubic meters per hour has the following composition in percent by volume:

| | Percent by volume |
|---|---|
| $CO_2$ | 76.8 |
| $H_2$ | 0.8 |
| $N_2$ | 17.7 |
| $O_2$ | 4.7 |
| | 100.0 |

Scrubbing fluid at a rate of 40 standard cubic meters per hour is withdrawn from the scrubbing fluid cycle and passed through the distilling unit 26.

EXAMPLE 2

A feed gas which is rich in hydrogen and carbon dioxide is to be purified to a content of 10 p.p.m. residual carbon dioxide.

To attain this low residual concentration, $CO_2$-free nitrogen from an ancillary plant is used as a stripping gas in the regenerating column.

The regeneration by repeated flashing produces an exhaust gas which consists of pure $CO_2$ having a purity above 99.9% by volume.

The crude gas is under a pressure of 40 kg./sq. cm. and a temperature of 30° C. It has the following composition in percent by volume:

| | Percent by volume |
|---|---|
| $CO_2$ | 35.0 |
| CO | 0.3 |
| $H_2$ | 64.0 |
| $CH_4$ | 0.3 |
| $N_2$ | 0.1 |
| Ar | 0.3 |
| | 100.01 |

The pure gas which is withdrawn through conduit 103 from the top of the absorption tower has the following composition in percent by volume:

| | Percent by volume |
|---|---|
| $CO_2$ | 0.001 |
| CO | 0.46 |
| $H_2$ | 98.5 |
| $CH_4$ | 0.43 |
| $N_2$ | 0.13 |
| Ar | 0.46 |
| | 99.981 |

This gas is obtained at a rate of 64 standard cubic meters per hour under a pressure of 39.6 kg./sq. cm. absolute pressure. The carbon dioxide withdrawn through conduit 154 from the third flashing stage (153, 143) has the following composition in percent by weight:

| | Percent by volume |
|---|---|
| $CO_2$ | 99.95 |
| $H_2$ | 0.035 |
| $CH_4$ | 0.015 |
| | 100.000 |

This gas is obtained at a rate of 11,500 standard cubic meters per hour.

The remaining exhaust gas is obtained at a rate of 33,900 standard cubic meters per hour and contains 10,000 standard cubic meters of nitrogen per hour. This gas has the following composition in percent by volume:

| | Percent by volume |
|---|---|
| $CO_2$ | 69.5 |
| $H_2$ | 1.0 |
| $N_2$ | 29.5 |
| | 100.0 |

The absorbent is circulated at a rate of 1030 cubic meters per hour.

What is claimed is:

1. In a process for removing carbon dioxide from compressed gas by a scrubbing process with N-methyl pyrrolidone, which process is carried out in a cycle of absorption and regeneration steps; the improvement which comprises scrubbing said compressed gas at about ambient temperatures, for a time sufficient to reduce the carbon dioxide content of said feed gas, with an absorbent consisting essentially of N-methyl pyrrolidone containing a substantially constant amount, up to about 3 weight percent, water and regenerating the absorbent laden with carbon dioxide at about ambient temperature by flashing laden absorbent to ambient pressure and stripping said flashed absorbent with a gas which is poor in carbon dioxide.

2. The improved process claimed in claim 1, wherein the carbon dioxide content of said scrubbed gas is less than about 40 parts per million.

3. A process as claimed in claim 1, in which said feed gas is under a pressure of approximately 40 kg./sq. cm. absolute pressure while being scrubbed.

4. A process as claimed in claim 1, wherein said carbon dioxide-rich absorbent is flashed in at least two stages to a final ambient pressure producing carbon dioxide of more than 99.9% by volume purity.

5. A process as claimed in claim 1, which comprises dividing said regenerated absorbent into a main stream and a partial stream; subjecting said partial stream to vacuum distillation; re-combining said partial stream after said vacuum distillation with said main stream; and recycling said combined streams to said scrubbing.

6. A process as claimed in claim 5, wherein said vacuum distillation is carried out under conditions whereby water and other impurities having a lower boiling point than said absorbent are removed as a distillate.

7. A process as claimed in claim 5, wherein said vacuum distillation is carried out under conditions whereby the absorbent is separated from higher boiling impurities by removing said absorbent as a distillate.

8. A process as claimed in 1, wherein the exhaust stripping gas containing N-methyl pyrrolidone is scrubbed with water to produce an aqueous solution of N-methyl pyrrolidone which is combined with a partial stream of regenerated solvent and said combined solution is subjected to said vacuum distillation.

9. A process as claimed in claim 1, wherein said absorbent when used for scrubbing has a water content of about 1 percent by weight.

10. A process as claimed in claim 1, which is carried out at ambient temperatures below zero degree centigrade and in which N-methyl pyrrolidone is injected into said feed gases before they are scrubbed to prevent a formation of ice.

11. A process as claimed in claim 1, wherein nitrogen which is substantially free of carbon dioxide is bubbled through said absorbent after the last flashing thereof.

12. A process as claimed in claim 1, wherein said carbon dioxide-rich absorbent is stripped with air.

13. A process as claimed in claim 1, wherein said N-methyl pyrrolidone has admixed therewith about 0.5 to 3 weight percent water.

14. A process as claimed in claim 1, wherein the gas exhausted from said stripping is scrubbed with water to recover N-methyl pyrrolidone values therefrom, and wherein the produced aqueous solution of N-methyl pyrrolidone is combined with a partial stream of said regenerated absorbent and the combined stream subjected to vacuum distillation.

References Cited
UNITED STATES PATENTS

| | | | |
|---|---|---|---|
| 2,826,266 | 3/1958 | Hachmuth et al. | 55—68 |
| 3,001,608 | 9/1961 | Lorenz et al. | 55—48 |
| 3,193,986 | 7/1965 | Forster | 55—68 |
| 3,225,519 | 12/1965 | Stotler | 55—51 |
| 3,324,627 | 6/1967 | Kohrt | 55—51 |
| 3,331,189 | 7/1967 | Worley | 55—73 |

REUBEN FRIEDMAN, Primary Examiner

C. N. HART, Assistant Examiner

U.S. Cl. X.R.

55—68